Dec. 1, 1959  G. F. WARREN  2,915,081
TRAILER HOUSE DRAIN CONNECTIONS
Filed March 26, 1956
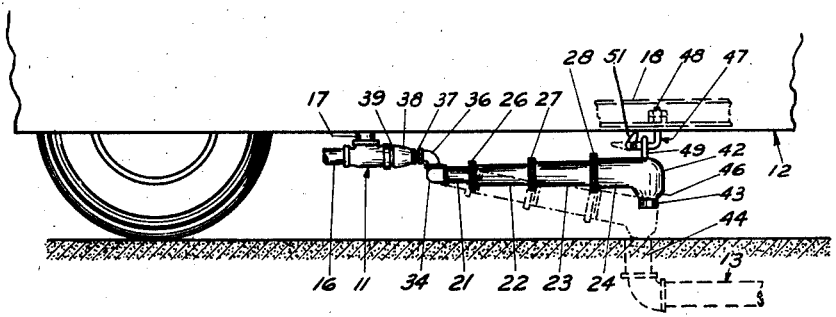
Fig. 1
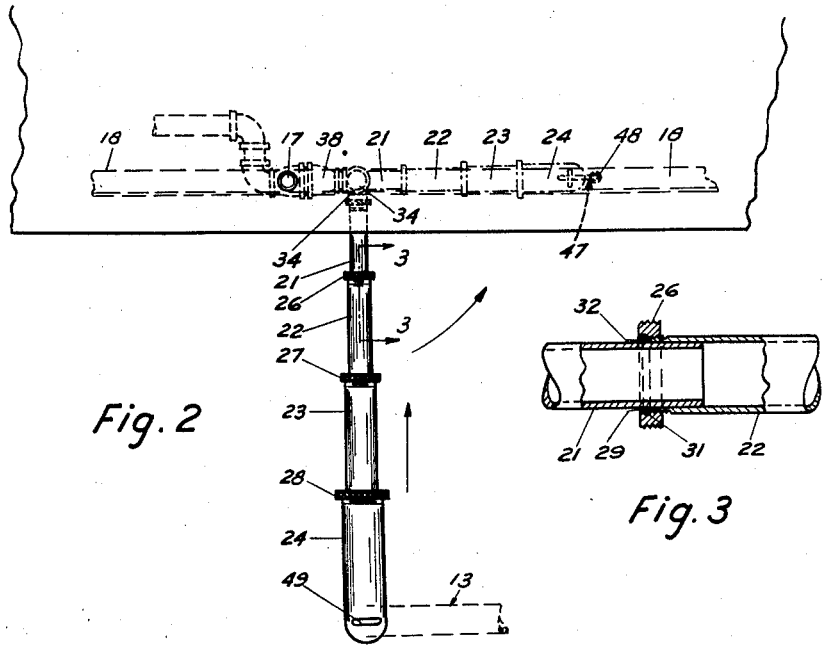
Fig. 2
Fig. 3
George F. Warren
INVENTOR.
BY Llewellyn A. Young
His Attorney

2,915,081
TRAILER HOUSE DRAIN CONNECTIONS

George F. Warren, Reno, Nev.

Application March 26, 1956, Serial No. 573,773

6 Claims. (Cl. 137—344)

This invention relates to a drain or sewer connection for a house trailer.

Heretofore it has been customary to use a plastic or rubber hose to effect a connection between the outlet drain on a house trailer and a conventional sewer system. Whenever the house trailer was moved it was necessary to disconnect the hose from the bottom of the trailer, clean it out, and then place it inside the house trailer. When the house trailer arrived at a new destination the user would then take the hose from inside the trailer, connect it to the bottom of the trailer and to the sewer connection. This type of sewer drain connection is quite inconvenient. Due to the fact that in the user's haste to be underway the hose frequently was not cleaned thoroughly, the floor of the house had to be cleaned when the hose was stored therein.

An object of this invention is to provide a novel type connection for connecting the drain outlet on a trailer house with a sewage system, that is simple to construct and to use, and which may be manufactured inexpensively.

Another object of the invention is the provision of a drain connection of the foregoing type that may be readily supported on the bottom of the house trailer whenever it is desired to have it disconnected from the sewage system.

Another object of the invention is the provision of a drain connection that permits quick installation so that a connection between the drain outlet on the trailer house and the sewage system may be made in a minimum of time and with a minimum of manipulation.

Another object is the provision of an extensible drain connection for the foregoing use that will positively retain any pre-selected adjusted length.

Another object is the provision of a drain connection in the foregoing type with means for positively preventing any leakage at the joints due to stoppage of the sewage system.

Another object of the invention is the provision of a drain connection of the above type that may be retained simply yet positively on the bottom of the house trailer and which can yet be quickly removed from its supported position and installed for use.

Other objects and advantages of the invention will readily be apparent upon inspection of the drawings in which:

Figure 1 is a fragmentary side view of the back portion of a house trailer showing a drain connection embodying the present invention.

Figure 2 is a fragmentary top view of the house trailer showing the drain connection in an extended position.

Figure 3 is a sectional view taken substantially along the line 3—3 in Figure 2.

Referring now to the drawings, the invention is shown embodied in a drain connection for connecting an outlet drain 11 on a house trailer 12 with a sewer system 13. For purposes of simplifying the drawings only a fragmentary view of the back portion of a conventional house trailer is shown, in which a drainpipe 16 and drainpipe 17 are joined together by a T to define the drain outlet 11. Also for purposes of simplification only a channel iron member 18 of the frame of the house trailer is shown. In general the drain connection is adapted to be supported on the underside of the house trailer and provision is made for swinging the drain connection in a horizontal direction and a vertical direction or a combination of these directions so that a connection with a sewer system may be effected readily.

As best seen in Figures 1 and 2 the drain connection includes a plurality of short pieces of pipe 21, 22, 23 and 24 of different diameters and arranged in telescopic relation. Thus for purposes of illustration the piece 21 fits snugly into the piece 22, the latter fits snugly into the piece 23, and the piece 23 fits snugly into the piece 24. With this construction it is apparent that when all the pieces are in their nested position the drain pipe has a relatively short length whereas when the pieces of pipe are in their extended position (see Figure 2) the drainpipe is comparatively long. It is evident also that the length of the drainpipe may be adjusted to any desired intermediate length.

Provision is made for holding the pieces 21, 22, 23 and 24 in any desired adjusted position relative to each other. To this end, lock nuts 26, 27 and 28 are employed. The construction of the lock nut 26 between pieces of pipe 21 and 22 is best shown in Figure 3. The lock nuts 27 and 28 are of similar construction. The lock nut 26 is adapted to be threaded on the end of the piece 22 overlapping the piece of pipe 21 and has an opening 29 through which the piece of pipe 21 may pass. An annular gasket 31 of a diameter to snugly receive the piece of pipe 21 is disposed between a flange 32 defining the outside of the opening 29 and the end of the piece of pipe 22. When the gasket 31 is compressed against the end of the piece of pipe 22 as by screwing the lock nut 26 on the piece 22, the pieces of pipe 21 and 22 are retained in any desired adjusted position relative to each other. In some instances it may be desired to use a longitudinally extending slot (not shown) formed in the end of the piece 22 upon which the lock nut is threaded so that when the lock nut is screwed onto the pipe 22 the end of the pipe may be deformed sufficiently to insure that there can be no relative movement between pipes 21 and 22. It is also observed that with this construction the gasket 31 prevents any leakage between the pipes 21 and 22.

The drain connection is connected to the outlet drain 11 in this instance by an elbow 34, a street ell 36, a nipple 37, a reducer 38, and a nipple 39. The nipple 39 threads into the outlet 11 and the reducer 38 and reduces the outlet drain 11 opening to the size of the pipe 21. While a specific type of connection has been shown between the outlet 11 and the pipe 21 it is to be understood that other pipe connections may be utilized. The connection between the elbow 34 and the street ell 36 allows the drainpipe to be rotated about the axis of the male end of the street ell which, as shown in Figure 1, is a vertical axis. This construction allows the drain to be swung in and out from under the house trailer. The connection of the street ell 36 with the nipple 37 permits the drainpipe to be rotated about the axis of the bushing (which in Figure 1 defines a horizontal axis). This connection allows the drainpipe to be inclined to any desired position between that shown in Figure 1 and the position necessary to effect a connection of the drainpipe with the sewer system. It is apparent that with these two connections limited universal movement of the drainpipe is permitted. Thus a connection with a sewerline may readily be effected.

The outer end 42 of the piece of pipe 24 is closed and terminates in a downwardly facing spout 43 adapted to be received in an upwardly facing opening 44 of the sewer system 13. The outside diameter of the spout 43 is such that it may be received in the inside of the opening 44. The portion 46 of the pipe 24 adjacent the spout 43 tapers from the cylindrical portion of the pipe to the spout 43; thus this construction can be used with all conventional sizes of openings of sewer systems. It is to be understood that where desired a threaded connection may be used between the piece of pipe 24 and the sewerline 13, in which case a completely closed sewer system is assured.

Provision is made for supporting the drainpipe on the underside of the trailer house. To this end the free end of the drainpipe is supported by a quick-release and attachment means 47. In general the latter means includes a hook-shaped member 48 bolted to a channel iron 18 on the underside of the house trailer. The free end of the hook-shaped member 48 is shaped to be received in an eye 49 secured to the top of the piece of pipe 24. A manually movable, spring-biased locking member 51 is pivotally mounted on the free upper end of the hook 48 in a conventional manner. In the position of the locking member 51 shown in Figure 1, the locking member 51 secures the eye 49 on the hook 48. It is apparent that the locking member 51 may be manually moved to the dotted-line position shown in Figure 1. In this position of the parts, the drainpipe may be telescoped sufficiently to allow the eye 49 to be free of the hook and, in turn, the drainpipe to be moved to any desired position. It is to be understood that other types of fasteners, such as straps, snap-hooks, and the like, could be utilized for effecting a support of the drainpipe on the bottom of the trailer.

The operation of the drain connection is readily apparent from the drawings, but may be summarized as follows:

Assume that the pieces of pipe 21, 22, 23 and 24 are in their retracted position, and the drainpipe is supported on the hook 47 on the bottom of the trailer house. In this position of the parts the drainpipe is positively supported above the ground and the house trailer may be moved from one location to another. Assume for purposes of discussion that the house trailer is at a new location and it is desired to connect the drain outlet 11 on the house trailer with the sewage system 13. The user moves the locking member 51 to its horizontal position, shown in Figure 1, and telescopes the pipes together so that the eye 49 clears the hook 47 and locking member 51. The user then pulls the drain from beneath the trailer, as by causing the pieces of pipe to swing about the street ell 36, and adjusts the pieces 21, 22, 23, and 24 relative to each other so that the spout 43 may be inserted in the opening 44. Concurrently with the foregoing the user applies a downward pushing force to the drainpipe so that the drainpipe swings about the axis of nipple 37 and the spout 43 may be placed in the opening 44. The user then manually adjusts the lock nuts 26, 27 and 28 to compress the gaskets in each lock nut against the ends of the pieces of pipe with which they are associated. The pieces of pipe are thus retained in the desired positions; also leakage between joints is prevented.

When it is desired to move the trailer to another installation the operator releases the lock nuts 26, 27 and 28 and raises the drainpipe to a nearly horizontal position. The pieces 21, 22, 23 and 24 are then telescoped to a retracted position. When the drainpipe is sufficiently short, the user applies a force to the drainpipe to swing it under the trailer. As soon as the user has the eye 49 on the top of piece 24 in alinement with the hook 47, the drainpipe is extended so as to thread the eye 49 with the hook 47. Thereafter the locking member 51 is raised to its vertical position shown in Figure 1, and the drainpipe is thus supported at one end by the connection with the outlet 11 and at its opposite end by the hook 47. With the pipe in this position the house trailer is ready to be moved to a new location.

From the foregoing it is seen that the drain connection can readily be connected and disconnected from any sewer system by simple manual manipulations. Further, it is obvious that this connection provides a drain connection that is always ready for use; that is simple to construct, inexpensive to manufacture, simple to store and transport, and which eliminates the mess that has generally been met with in the use of conventional constructions when stored inside the trailer house. Furthermore it is obvious that this connection provides a unit in which there is no possibility of leakage in the unit itself.

I claim:

1. In a drainpipe for connecting the bottom outlet drain on a trailer house with an opening in a sewer system the combination of a plurality of relatively short pieces of pipe telescopically arranged and movable between a contracted position in which the pipes are in nested relation, substantially one within the other, and an extended position in which said pieces of pipe define a drain connection longer than one of said single pieces of pipe; means acting between adjacent pieces of pipe for holding said pieces of pipe in pre-selected positions relative to each other; means for preventing leakage between adjacent pieces of pipe when the latter are in their extended positions; spout means attached to one piece of pipe shaped to be connected with said opening in said sewer system; connection means adapted to be connected to the opposite end of said telescoping pipe for connecting said pipes to said bottom outlet drain, said last mentioned connection means providing for universal joint-like movement of said telescoping pipe about mutually perpendicular axes adjacent the point of connection with said outlet drain, said last mentioned connection means also forming a partial support for said pipes when said pipes are in their contracted position; and means adapted to act between said trailer house and said pieces of pipe for supporting said pipes beneath said trailer house when said pipes are in their contracted position whereby said drain pipe need not be disconnected from said trailer house when the latter is in transit.

2. The combination recited in claim 6 in which said last-mentioned means includes the connection between the outlet drain in the trailer house and hook and eye means acting between one of said pieces of pipe and said trailer house.

3. The combination for use with a sewer system having an opening of a trailer house having an outlet drain, a plurality of telescoping pieces of pipe movable between a retracted position in which the pieces of pipe are in nested relation, substantially one within the other, and an extended position in which said pieces of pipe define a drain connection longer than one of said single pieces of pipe; means between adjacent pieces of pipe for holding said pieces of pipe in pre-selected positions relative to each other; means for preventing leakage between adjacent pieces of pipe when the latter are in their extended positions; spout means attached to one of said pieces of pipe connected with said opening in said sewer system; and connection means connected to the opposite end of said telescoping pipe for connecting said pipes to said outlet drain, said last-mentioned connection means providing for a universal joint-like movement of said telescoping pipe about the point of connection with said outlet drain whereby said spout may be readily placed in said opening in the sewer system.

4. The combination for use with a sewer system having an opening of a trailer house having an outlet drain, a plurality of telescoping pieces of pipe of different diameters movable between a contracted position in which the pieces of pipe are in nested relation one within the other and an extended position in which said pieces of pipe define a drain connection longer than one of said single pieces of pipe, all of said pieces of pipe but one having a threaded end; a lock nut encircling one piece of pipe and adapted to be threaded on the adjacent piece of pipe; a compressible annular gasket associated with each lock nut; spout means attached to one end of said drain connection connected with said opening in said sewer system; and a street ell in communication with said outlet drain and an elbow between the other end of said drain pipe and said street ell and manually releasable means for supporting one end of one of said pieces of pipe on said trailer house when said pieces of pipe are in their nested relation whereby to hold said drain pipe above the ground beneath the trailer house when the trailer house is in transit.

5. In a drain pipe for connecting the bottom outlet drain on a trailer house with an opening in a sewer system the combination of a plurality of telescoping pieces of pipe of different diameters movable between a contracted position in which the pieces of pipe are in nested relation one within the other and an extended position in which said pieces of pipe define a drain connection longer than one of said single pieces of pipe; means between adjacent pieces of pipe for holding said pieces of pipe in pre-selected positions relative to each other; spout means attached to the bottom of the pipe having the largest diameter and adapted to be disposed in said opening in said sewer system; a street ell adapted to be in communication with said outlet; an elbow between the other end of said drainpipe and said street ell; an eye on the top of said drainpipe; a hook adapted to be mounted on said trailer house shaped to link with said eye; and means for positively securing said eye on said hook whereby to hold said pieces of pipe in their nested relation beneath the trailer house and out of contact with the ground when the trailer house is in transit.

6. The combination of a trailer house having an outlet drain, a sewer system having an opening for the reception of waste matter, a plurality of relatively short pieces of pipe telescopically arranged and movable between a contracted position in which the pipes are in nested relation substantially one within the other and an extended position in which said pieces of pipe define a drain connection longer than one of said single pieces of pipe; means acting between adjacent pieces of pipe for holding said pieces of pipe in preselected positions relative to each other; means for preventing leakage between adjacent pieces of pipe when the latter are in their extended positions; spout means on one piece of pipe adapted to be inserted in said opening in said sewer system; connection means connected to the opposite end of said telescoping pipes connecting said pipe to said bottom outlet drain, said last mentioned connection means providing limited universal movement of said telescoping pipe about the point of connection with said outlet drain on said trailer house; means supporting said pipes on said trailer house when said pipes are in their contracted position, said last mentioned means being manually operable to permit quick assembly and disassembly of the drain pipe connection between the trailer house and the sewer system.

References Cited in the file of this patent

UNITED STATES PATENTS

| | | |
|---|---|---|
| 566,853 | Foreman | Sept. 1, 1896 |
| 1,478,925 | Steed | Dec. 25, 1923 |
| 2,537,232 | Nottingham | Jan. 9, 1951 |